United States Patent [19]

Miyake

[11] Patent Number: 5,404,470
[45] Date of Patent: Apr. 4, 1995

[54] INFORMATION PROCESSING APPARATUS FOR PROCESSING INSTRUCTIONS BY OUT-OF-ORDER EXECUTION

[75] Inventor: Jiro Miyake, Osaka, Japan

[73] Assignee: Matsushita Electric Industrial Co., Ltd., Osaka, Japan

[21] Appl. No.: 976,053

[22] Filed: Nov. 13, 1992

[30] Foreign Application Priority Data

Nov. 26, 1991 [JP] Japan ................... 3-310536

[51] Int. Cl.$^6$ ............................................. G06F 9/00
[52] U.S. Cl. ................... 395/375; 364/239; 364/246.3; 364/254.3; 364/259; 364/261.3
[58] Field of Search ................ 395/375, 800, 250

[56] References Cited

U.S. PATENT DOCUMENTS 4,630,195  12/1986  Hester et al. .
5,201,056  4/1993  Daniel et al. ................... 395/800

FOREIGN PATENT DOCUMENTS 1213719  8/1989  Japan .

OTHER PUBLICATIONS

H. Dwyer et al. "A Fast Instruction Dispatch Unit for Multiple and Out-of-Sequence Issuances".
"An Efficient Algorithm for exploiting multiple Arithmetic Units" by R. M. Tomasulo; IBM Journal, Jan. 1967; pp. 25–33.
"Implementation of Precise Interrupts in Piplined Processors" by James E. Smith; 1985 IEEE; pp., 36–44.

*Primary Examiner*—Parshotam S. Lall
*Assistant Examiner*—Ayni Mohamed
*Attorney, Agent, or Firm*—Lowe, Price, LeBlanc & Becker

[57] ABSTRACT

An information processing apparatus comprising a register file 5 for containing a plurality of data storing registers, a data holding unit 2 including a plurality of data holding entry blocks, a temporary instruction holding unit 1 having a plurality of instruction holding entry blocks for temporarily holding instructions, execution units 6, 7 for executing transactions designated by instructions and outputting result data by use of data read out from the register file 5 or the data holding unit 2, and an instruction selecting unit 3 for selecting an instruction executable among instructions held in the instruction holding unit 1. The data holding entry block (DB0~DB5) includes a data field 23 storing the result data outputted from the execution units 6, 7, a destination register field 21 storing destination register numbers, a dependency detector 24, a dependency information field 22, and a data storing bit 27 that shows a storing state of data in the data field 23, and the dependency detector 24 is connected to the destination register field 21 so as to compare a source register number of any succeeding instruction with a destination register number stored in the destination register field 21 to check data dependency therebetween and output a data dependency information. The dependency information field 22 holds the data dependency information and outputs an instruction executable signal 31 based on the data dependency information and the data storing bit 27. And the instruction selecting unit 3 responds to the instruction executable signal 31 to select the executable instruction among instructions stored in the temporary instruction holding means 1.

25 Claims, 10 Drawing Sheets

FIG. 9

| FLOW BIT | ADDRESS | INSTRUCTION |
|---|---|---|
| 001 | 100 | add r1, r2, r3 |
| 001 | 104 | cmp r1, r4 |
| 001 | 108 | be 200 |
| 001 | 10C | or r4, r5, r4 |
| 010 | 110 | and r5, r3, r1 |
| ⋮ | ⋮ | ⋮ |
| 100 | 200 | sub r1, r3, r5 |
| 100 | 204 | or r2, r4, r6 |

INFORMATION PROCESSING APPARATUS FOR PROCESSING INSTRUCTIONS BY OUT-OF-ORDER EXECUTION

BACKGROUND OF THE INVENTION

1. Field of the Invention:

The present invention relates to an information processing apparatus capable of allowing instructions to be executed flexibly in an appropriate order different from a predetermined order defined in the program.

2. Description of the Prior Art:

Conventionally in a field of information processing art, a pipelined processing in which a plurality of instructions are executed simultaneously or in an overlapped manner is frequently used for improvement of performance of information processing apparatuses.

However, this pipelined processing is disadvantageous when many steps are involved in a pipeline for one instruction, for example, in a data reading-out operation from memories or a floating point arithmetic operation. Because, in the case where data obtained by one instruction is mandatorily required for any succeeding instruction, the succeeding instruction is suspended its execution until the required data is obtained, thus resulting in adversely affecting an overall performance of the information processing apparatus. By the way, such an interrelation that the later instruction requires the data obtained as a result of completion of the former instruction is normally called "data dependency."

On the other hand, there has been already proposed a method that can avoid deterioration of performance to be caused due to data dependency, as disclosed in a technical paper, R. M.Tomasulo, An Efficient Algorithm for Exploiting Multiple Arithmetic Units: IBM Journal, Vol. 11 Jan. 1967, pp. 25-33.

In accordance with this method proposed by R. M. Tomasulo, in the case where a certain instruction is suspended due to its data dependency nature and if there is any instruction capable of being executed immediately in its succeeding instructions, that succeeding instruction is executed first.

A method for executing instructions in an order different from that being predetermined in the program is called as an "out-of-order execution".

According to the disclosure in the above-introduced technical paper, every instruction to be executed is accompanied by an identification tag, and this tag is outputted together with the result data after the execution of the instruction is completed in an execution (arithmetic) unit.

Furthermore, there are provided reservation stations at respective input terminals of a plurality of execution units. After the instruction is decoded, data required for execution of this instruction are read out from a register file and are stored in the reservation station of the corresponding arithmetic unit together with the decoded instructions.

In the case where the required data are not obtained since the instruction has data dependent nature in connection with a previous instruction, a tag of the previous instruction supplying the required data is stored in the reservation station. In order to take in the required data, the reservation station compares the tag newly outputted from each execution unit and the tags already stored in the reservation station. Then, any instruction that has first fully obtained the required data among a plurality of instructions is executed first.

FIG. 10 is a schematic block diagram showing a conventional information processing apparatus utilizing the reservation station.

In FIG. 10, a register file 101 contains a plurality of registers for storing data. Arithmetic units 102 serve as execution units. And, each arithmetic unit 102 outputs an operation result data on a corresponding result bus 103 and also outputs a tag on a corresponding tag bus 104 so that the outputted result data can be discriminated by the tag; in other words, to indicate which instruction the result data is related to.

In this conventional processing apparatus, there are provided three arithmetic units 102 so that three arithmetic operations can be carried out at the same time. The reservation station comprises a plurality of entry blocks 105. Each arithmetic unit 102 are associated with two entry blocks 105.

Each entry block 105 includes a control field 111 that stores control information obtained after decoding instructions, #1 tag field 112, #1 source field 113, #2 tag field 114, and #2 source field 115. The #1 source field 113 and the #2 source field 115 serve to store two source data to be used in the arithmetic unit 102. The #1 tag field 112 and the #2 tag field 114 associate with the #1 source field 113 and the #2 source field 115, respectively, and store tags so as to identify data supplied from any one of three arithmetic units 102 in the case where no source data is supplied from the register file 101 due to data dependency nature in connection with the previous instruction.

Each entry block 105 has six comparators 116 for comparing the tags outputted from three arithmetic units 102 with the tags stored in the #1 tag field 112 and the #2 tag field 114. If any tag from the arithmetic units 102 coincides with the stored tag in the #1 and #2 tag fields 112, 114, the result data of the corresponding arithmetic unit 102 is stored in the corresponding #1 source field 113 or #2 source field 115. And, then, if two source data in the #1 and #2 source fields 113, 115 are both obtained, their associated arithmetic unit 102 executes its arithmetic operation in accordance with the suspended instruction.

As can be understood from the foregoing description, if the number of the arithmetic units that output result data simultaneously is three and the number of data required for processing each arithmetic operation is two, at least 6 (=3×2) comparators are necessary per one entry block of the reservation station in above-described conventional information processing apparatus. If each arithmetic unit is associated with a reservation station containing two entry blocks, total number of comparators should be provided in the information processing apparatus increases up to 36 pieces, as a result.

Furthermore, in order to detect a condition that the data dependent situation is eliminated and find out an instruction to be executed next, it is normally further required to compare tags, thus resulting in slowing down its operation speed.

Moreover, in accordance with the constitution of the above-described conventional information processing apparatus, an execution of instruction is forced to carry out only in its corresponding arithmetic unit nevertheless another arithmetic unit is ready for executing a new arithmetic operation. Hence, even if two source data are obtained, the instruction cannot be executed until the corresponding arithmetic unit becomes available irrespective of availability of other arithmetic units.

If an instruction is carried out by the out-of-order execution and then the data obtained are directly written in a register file, it will cause a problem when an exceptional condition is raised. In the case where the exceptional condition is raised, addresses of instructions that are unable to be completed due to this exceptional condition are all evacuated. After the processing of this exceptional condition has been finished, the execution is again initiated from above evacuated addresses.

However, this out-of-order execution includes the following problem. If the instructions succeeding the evacuated addresses are already completed their executions by the timing that the exceptional condition is raised and further the register file has already been renewed, these succeeding instructions have to be again executed after the processing of the exceptional condition is finished.

In order to solve this problem, an advanced device, reorder buffer, has been proposed, for example, as disclosed in the technical paper, James E. Smith et al, Implementing Precise Interrupts in Pipelined Processors: IEEE Transactions on Computers, Vol. 37, No. 5, May 1988, pp 562–573.

FIG. 11 is a block diagram showing a conventional information processing unit adopting this reorder buffer. In FIG. 11, a reorder buffer 121 includes a plurality of entry blocks 122 each containing a data field 56 storing data and a destination register field 55 storing register numbers; i.e. destination register numbers, that indicate the numbers of registers into which the above data are stored.

When an arithmetic unit 52 outputs a result data that is obtained by the out-of-order execution, the reorder buffer 121 functions to temporarily store this result data and, in turn, transfer this data into a register file 51 in compliance with the instruction written in the program.

Before the data held in the reorder buffer 121 is transferred into the register file 51, if any succeeding instructions will require that data, it becomes now necessary to inhibit this data from being transferred into the register file 51 so that this data can be supplied from the reorder buffer 121 in a phase that the corresponding instruction is executed later.

To this end, each entry block 122 of the reorder buffer 121 is equipped with a dependency detector 57 that compares the destination register numbers stored in the destination register field 55 of the entry block 122 with source register numbers 60 and 61 of succeeding instructions to detect the data dependency.

If the data dependency relationship is recognized, the dependency detector 57 generates data dependency information 64, 65. And then, on the basis of the data dependency information 64, 65, output from the data field 56 of the entry block 122 is controlled.

However, in the case where a plurality of entry blocks 122 in the reorder buffer 121 have the same destination register number, the latest data has to be selected. For this reason, there is normally provided a circuit that functions to prioritize a plurality of data having the same value and select the up-to-date one.

FIG. 12 is one example of such a selecting circuit with prioritization function. The selecting circuit 130 basically acts to cancel a coincident signal having minor priority if the existence of other coincident signal having more higher priority is recognized. Accordingly, the larger the number of the entry blocks becomes the more the number of gate stages increases, resulting in slowing down an overall operation speed.

In a normal application, 15% to 25% of all the instructions to be executed are branch instructions. Furthermore, most of these branch instructions are classified into a conditioned branch instruction whose branching-off operation depends on a result of a judgement whether or not a condition code comes to have a value satisfying the condition designated by the instruction.

In the case where an instruction arrayed immediately before a conditioned branch instruction renews the condition code, the judgement of branching-off operation is delayed. If an instruction to be accessed as a result of branching-off operation is fetched after waiting the completion of the judgement, it results in carrying out useless cycles until the fetch of the accessed instruction has been finished.

In order to reduce these useless cycles, one of prospective methods is to fetch the instruction to be accessed in advance and initiate its execution as soon as the judgement of branching-off operation is completed. However, even in this method, it was not possible to execute the instructions succeeding this branch instruction beforehand unless the branching-off judgement is finished. Thus, an application of out-of-order execution is unexpectedly limited to small number of instructions to be executed between two branch instructions. Accordingly, if frequently the branch instructions are executed, a merit of the out-of-order execution becomes excessively less.

As is apparent from the foregoing description, the conventional information processing apparatus requires many circuits for storing numerous information, for example, a field for storing source data necessary for holding the instructions not having been executed, a field for storing tags necessary for acquiring later the source data not having been obtained immediately. And, the conventional information processing apparatus further requires a great number of comparators for detecting the elimination of data dependency condition by comparing the tag transferred from the arithmetic unit with the tag already stored. Hence, a scale of circuit is inherently enlarged and a processing speed is correspondingly slowed down.

Moreover, in the case where the detection of data dependency is carried out in the buffer that functions to transfer the result data obtained by way of the out-of-order execution into the register file in compliance with an order of instruction defined in the program, if the same register number is registered in a plurality of entry blocks, the prioritization processing among data is additionally required. Therefore, as the number of entry blocks in the buffer increases, delay of detection is further increased.

Still further, until the branching-off condition is satisfied, it is impossible to execute the instructions succeeding that branch instruction. That narrows an applicability of out-of-order execution and, therefore, there was a problem that the effect of out-of-order execution could not be sufficiently obtained.

SUMMARY OF THE INVENTION

Accordingly, the present invention has a purpose, in view of above-described problems or disadvantages encountered in the prior art, to provide an information processing apparatus which is capable of excluding a great number of circuits storing tags or comparators to realize the reduction of circuit scale and also capable of speeding up its processing speed.

Furthermore, the present invention aims to provide an information processing apparatus which is capable of rapidly executing the detection of data dependency even though the number of entry blocks is increased. That is, even if the same register number is registered in a plurality of entry blocks, the present invention can enable to identify the latest registered one in the comparison of register numbers for the detection of the data dependency. Therefore, the conventional complicated selecting method in which the coincident signals are prioritized is no longer required.

Still further, the present invention has a purpose to provide an information processing apparatus which is capable of bypassing the branch instruction to execute succeeding instructions before branching-off condition is satisfied. That is, in accordance with the present invention, the dependency relationship can be detected by discriminating a plurality of flows by utilizing flow bits. Then, after the branching-off condition has been satisfied, unnecessary flows are designated and canceled.

In order to accomplish above purposes, a first aspect of the present invention provides an information processing apparatus comprising: register file means for containing a plurality of data storing registers; data holding means for including a plurality of data holding entry blocks; temporary instruction holding means having a plurality of instruction holding entry blocks for temporarily holding instructions; execution means for executing transaction designated by instructions and outputting result data by use of data read out from said register file means or said data holding means; instruction selecting means for selecting an instruction executable among instructions held in said instruction holding means; said data holding entry block including a data field storing said result data outputted from the execution means, a destination register field storing a destination register number, a dependency detector, a dependency information field, and a data storing bit that shows a storing state of data in said data field; said dependency detector being connected to said destination register field so as to compare a source register number of any succeeding instruction with a destination register number stored in the destination register field to detect data dependency relationship and output data dependency information; said dependency information field holding said data dependency information and outputting an instruction executable signal based on said data dependency information and said data storing bit; and said instruction selecting means responding to said instruction executable signal to select the executable instruction among instructions stored in said temporary instruction holding means.

Furthermore, a second aspect of the present invention provides an information processing apparatus comprising: register file means for containing a plurality of data storing registers; data holding means for including a plurality of data holding entry blocks; execution means for executing transaction designated by instructions and outputting result data by use of data read out from said register file means or said data holding means; said data holding entry blocks including a data field storing said result data outputted from the execution means, a destination register field storing destination register numbers, a dependency detector, a dependent object bit, and a comparator; said dependent object bit being set when the destination register number is stored in the destination register field of its corresponding data holding entry block; said dependency detector comparing the destination register number stored in the destination register field with destination register number of succeeding instruction to output a coincident signal when these destination register numbers coincide with each other; said dependent object bit being reset in response to said coincident signal; and said dependency detector being connected to said destination register field so as to compare a source register number of the succeeding instruction with the destination register number stored in the destination register field to detect data dependency and output a data dependency information under the condition that said dependent object bit is set.

Still further, a third aspect of the present invention provides an information processing apparatus comprising: register file means for containing a plurality of data storing registers; data holding means for including a plurality of data holding entry blocks; execution means for executing transaction designated by instructions and outputting result data by use of data read out from said register file means or said data holding means; said data holding entry blocks including a data field storing said result data outputted from the execution means, a destination register field storing destination register numbers, a dependency detector, an entry validity bit, a flow field, a flow discriminating circuit, and a flow invalidating circuit; said entry validity bit being set when the destination register number is stored in the destination register field; said flow field storing flow bit discriminating flow of instruction; said flow discriminating circuit comparing a flow bit indicating the flow that becomes an object of data dependency with a flow bit stored in said flow field to output a dependent object signal; said dependency detector being connected to said destination register field so as to compare a source register number of succeeding instruction with the destination register number stored in said destination register field to detect the data dependency and output a data dependency information in the case where said dependent object signal is outputted; said flow invalidating circuit inputting an invalidating flow bit and an invalidating request signal and comparing said invalidating flow bit with a flow bit stored in said flow field when the invalidation is requested by the invalidating request signal; and said entry validity bit being reset in response to the comparison result of said flow invalidating circuit.

In accordance with the first aspect of the present invention, the data dependency information is stored in the dependency information field of the data holding entry block. Then, after the result data has been obtained, the dependency information field is searched by the data storing bit. Thus, the elimination of data dependency is easily detected and it becomes possible to promptly select the next executable instruction.

Furthermore, in accordance with the second aspect of the present invention, an object of dependency detection can be designated by use of the dependent object bit. Therefore, even if the same destination register number is stored simultaneously in a plurality of data holding entry blocks, it can be avoided that a plurality of dependency detection information are obtained at the same time, thus resulting in a realization of speed-up in the dependency detection.

Moreover, in accordance with the third aspect of the present invention, respective flows in the program can be discriminated by use of flow bits. Accordingly, after the branching-off condition is satisfied, unnecessary flows can be designated and invalidated and, hence, it becomes possible to execute instructions succeeding the branch instruction before the branching-off condition has been fulfilled.

The above and other objects, features and advantages of the present invention will become more apparent from the following detailed description which is to be read in conjunction with the accompanying drawings.

BRIEF DESCRIPTION OF THE DRAWINGS

FIG. 9 is a view showing an example of several flow bits applied in the third embodiment of the present invention;

DETAILED DESCRIPTION OF THE PREFERRED EMBODIMENTS

Hereinafter, referring now to the accompanying drawings, embodiments of the present invention are explained in detail.

FIRST EMBODIMENT

Figure 1:
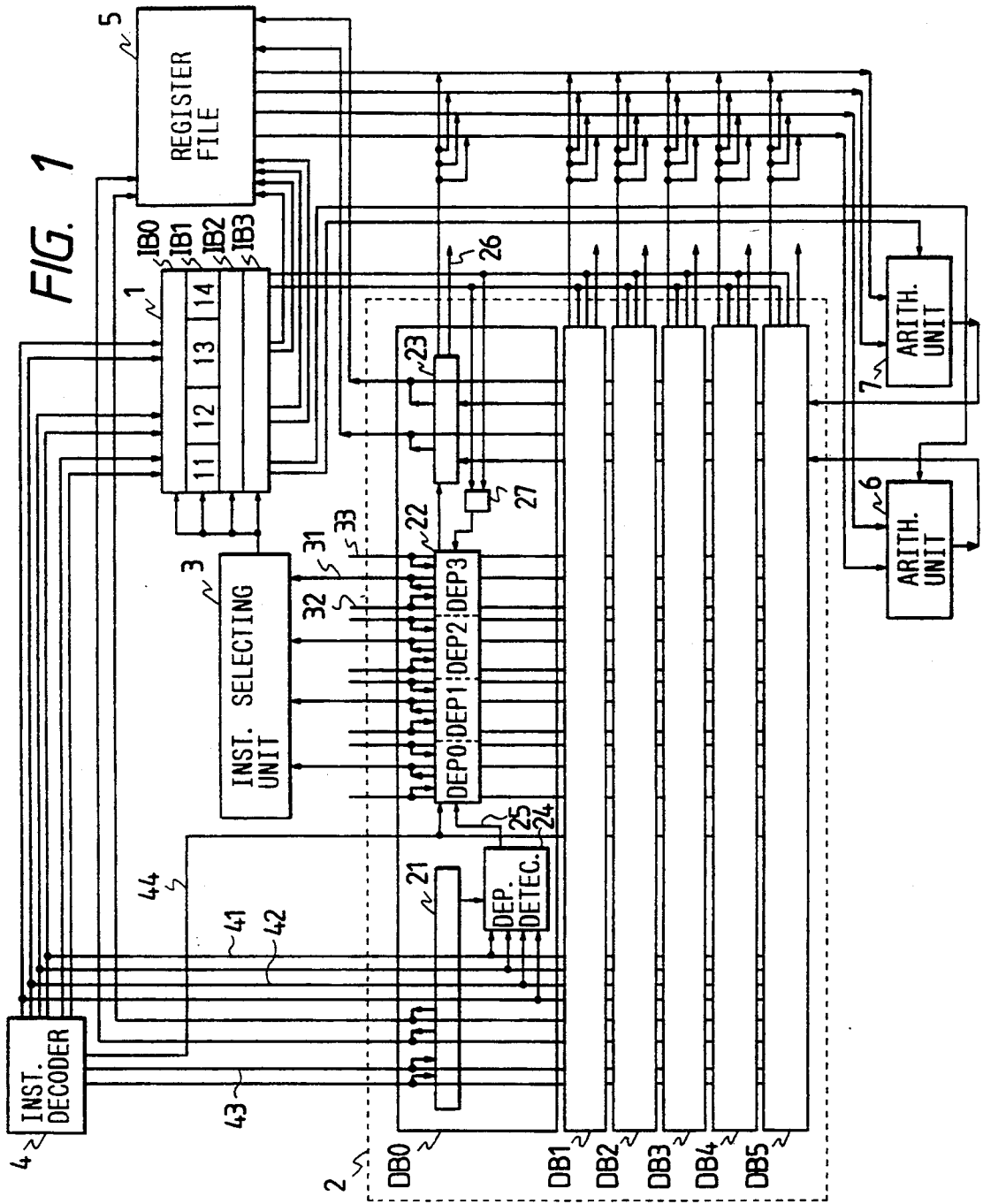
FIG. 1 is a schematic block diagram showing an information processing apparatus in accordance with a first embodiment of the present invention.

FIG. 1 is a block diagram showing an information processing apparatus in accordance with a first embodiment of the present invention.

In FIG. 1, the information processing apparatus includes an instruction holding unit 1, a data holding unit 2, an instruction selecting unit 3, and an instruction decoder 4. A register file 5 contains a plurality of data storing registers. Two arithmetic units 6, 7 serve as execution units each carrying out a predetermined arithmetic operation independently in compliance with an instruction. In this embodiment, two instructions are supplied per cycle and these instructions are executed by the out-of-order execution in two arithmetic units 6, 7.

The instruction holding unit 1 functions to store a decoded instruction temporarily in the case where this instruction cannot be immediately executed as this instruction requires result data of previous instruction. While this instruction is retained in the instruction holding unit 1, decoding of succeeding instructions are continued. If any instruction executable is found among the instructions succeeding the retained or suspended instruction that cannot be executed immediately due to data dependency, this executable instruction is carried out by the out-of-order execution.

The instruction holding unit 1 has four instruction holding entry blocks IB0~IB3. Each of the instruction holding entry blocks IB0~IB3 involves a control field 11 storing a control information obtained by decoding an instruction by means of the instruction decoder 4, first and second source register fields 12, 13, and a data holding entry pointer field 14 for storing a pointer for designating the entry block in the data holding unit 2.

The data holding unit 2 contains six data holding entry blocks DB0~DB5. Each entry block contains a destination register field 21 storing a register number of a destination register to which the result of executed instruction is stored, a dependency information field 22 storing data dependency information, and a data field 23 storing the result data as a result of execution. Furthermore, each of data holding entry blocks DB0~DB5 includes a dependency detector 24.

The dependency information field 22 consists of data dependency subfields DEP0~DEP3 corresponding to or associating with the instruction holding entry blocks IB0~IB3 of the instruction holding unit 1, respectively.

Though two instructions are supplied per cycle in this embodiment, only one instruction is explained hereinafter for simplifying the following explanation.

When the instruction is supplied, the instruction is decoded by the instruction decoder 4. And, at the same time, the numbers 41, 42 of first and second source registers that are required for the execution of the instruction are given to the data holding unit 2. Respective dependency detectors 24 in the data holding entry blocks DB0~DB5 compare thus given first and second source register numbers 41, 42 with destination register numbers already stored in the destination register field 21 to check the data dependency and output data dependency information 25.

An instruction decoded by the instruction decoder 4 is stored together with the first and second source register numbers 41, 42 in one of four instruction holding entry blocks IB0~IB3. At the same time, the data dependency information 25 outputted from the dependency detector 24 is stored in one of data dependency subfields DEP0~DEP3, and a destination register number 43 is stored in a destination register field 21 of one of six data holding entry blocks DB0~DB5.

In this case, the data dependency subfield into which the data dependency information 25 is stored is designated by a writing signal 32 so as to correspond to the instruction holding entry block into which the decoded instruction is stored. Furthermore, the entry number of its data holding entry block is stored in the data holding entry pointer field 14 of the instruction holding entry block that stores the decoded instruction.

When the data dependency information 25 shows no existence of data dependency or when the data field 23 already stores the result data irrespective of data dependency, an instruction executable signal 31 is outputted to notify that the instruction stored in the corresponding one of instruction holding entry blocks IB0~IB3 is now in an executable condition.

As two instructions are supplied per cycle in this embodiment, above-described transaction is independently carried out in each of these two instructions. In this case, the instruction decoder 4 detects the data dependency between two instructions to generate a dependency signal 44 showing dependent relationship between the supplied two instructions. This dependency signal 44 is fed to the data holding unit 2 and stored in the data dependency subfields DEP0~DEP3 of the corresponding data holding entry block.

The instruction selecting unit 3 responds to the instruction executable signals 31 fed from respective data dependency subfields DEP0~DEP3 to select an instruction to be actually initiated its execution. In this case, as there are two arithmetic units, up to two instructions can be selected simultaneously from the instruction holding unit 1. At the same time, the instruction selecting unit 3 gives a data reading-out signal 33 to one of data dependency subfield DEP0~DEP3 that corresponds to the read out instruction.

In response to the data reading-out signal 33, the data holding unit 2 searches the data dependency subfield which is given the data reading-out signal 33. Then, the data holding entry block having the data dependency is picked up and, in turn, the data in the data field 23 of that data holding entry block is read out. A data validity signal 26 showing validity of the data is also outputted together with the data.

While the data is read out from the data holding unit 2, the register file 5 is accessed by use of values of first and second source register fields 12, 13 read out from the instruction holding unit 1.

Either the data of the data holding unit 2 or the data of the register file 5 is selected based on the data validity signal 26 and, then, supplied to any one of two arithmetic units 6, 7 so that an arithmetic operation designated by the control information read out from the control field 11 of the corresponding instruction holding entry block can be executed.

When the arithmetic result is obtained, the pointer stored in the data holding entry pointer field 14 of the instruction holding unit 1 designates a data field 23 in the data holding entry block to store the arithmetic result.

A data storing bit 27 is set when the result data is stored in a corresponding one of the data holding entry blocks. Then, the dependency information field 22 in this entry block is searched to find out any data dependency subfield DEP0~DEP3 having the data dependency. And subsequently, if the data dependency is recognized, the instruction executable signal 31 is generated in order to indicate that the data dependency relationship is resolved and therefore execution of the suspended instruction now comes to possible.

On the basis of this instruction executable signal 31, the instruction selecting unit 3 selects an instruction to be executed next.

In the case where an arrival of the result data can be known in advance, in other words, when a period of time required for completing the instruction can be estimated in advance, it would be possible to initiate the search of the dependency information field 22 and finish the selection of the next instruction before the result data is obtained.

Next, an operation of the present embodiment is explained with reference to a simplified example shown in FIGS. 2~6. In this case, the data holding unit 2 has six entry blocks DB0~DB5 and the instruction holding unit 1 contains four entry blocks IB0~IB3. The data dependency information field of each entry block in the data holding unit 2 consists of four data dependency subfields DEP0~DEP3 corresponding to or associating with the entry blocks of the instruction holding unit 1, respectively.

Figure 2:
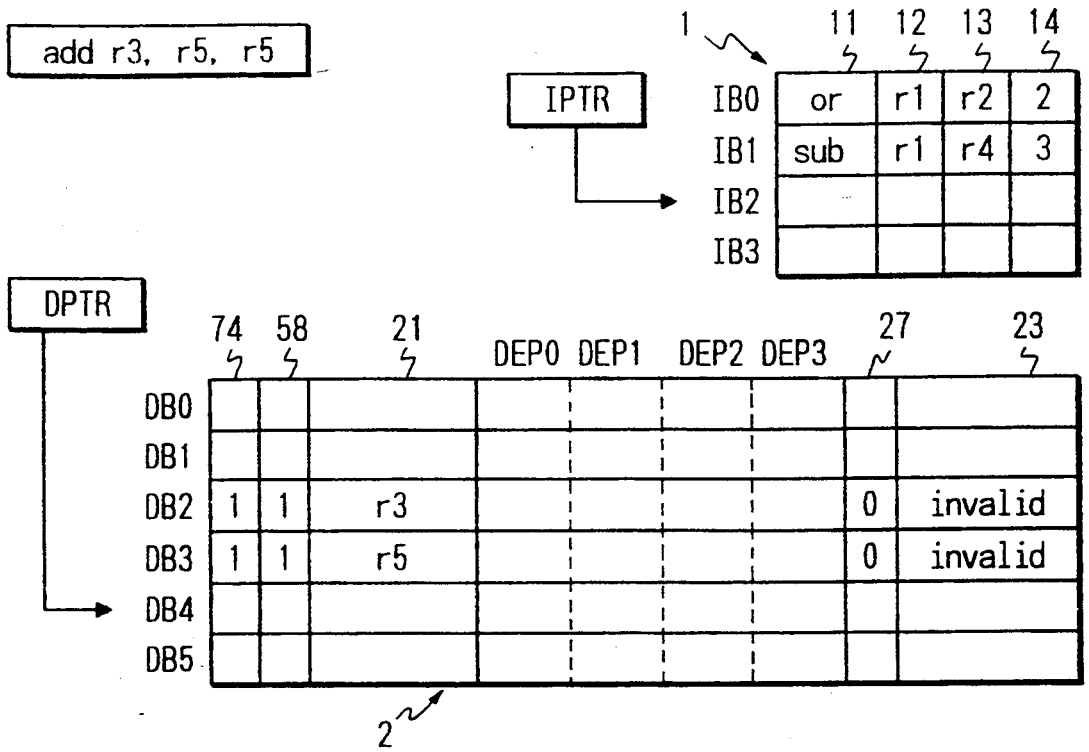
FIG. 2 is a simplified explanatory view partly illustrating an operation of the first embodiment.

First of all, in FIG. 2, an or-instruction and a sub-instruction are stored in a waiting condition in the instruction holding entry blocks IB0, IB1 of the instruction holding unit 1, respectively. The entry block to store the result of the or-instruction is DB2 that is designated by the data holding entry pointer field 14 of the entry block IB0. It is understood from the destination register field 21 of the DB2 that the destination register of the or-instruction is r3. In the same manner, the result of the sub-instruction is stored in the entry block DB3 and its destination register is r5.

In this condition, it is now supposed that an add-instruction is newly supplied. This add-instruction includes source registers r3, r5 and a destination register r5. An instruction holding entry block storing the source register numbers of the add-instruction is an entry block IB2 that is designated by the instruction storing pointer IPTR. A data holding entry block storing the destination register number of the add-instruction is an entry block DB4 that is designated by the destination storing pointer DPTR. After having finished the storage of the instruction, both the instruction storing pointer IPTR and the destination storing pointer DPTR are automatically incremented to point another entry blocks for a succeeding instruction.

Figure 3:
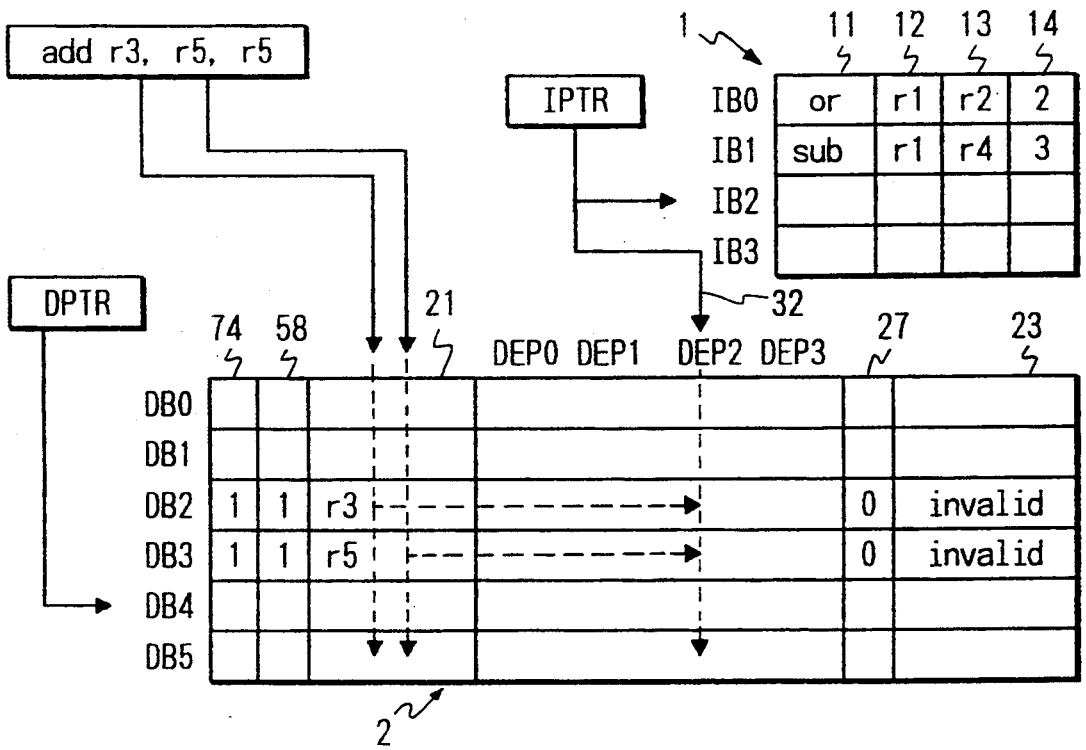
FIG. 3 is a simplified explanatory view partly illustrating an operation of the first embodiment, following the operation illustrated in FIG. 2.

In order to detect data dependency, the source register numbers r3, r5 of the add-instruction are given to every comparator in the destination register fields 21 of all the entry blocks DB0~DB5 in the data holding units 2. That is, these source register numbers r3, r5 are compared with the content of the destination register fields 21 as shown in FIG. 3.

With this comparison, it is found that this add-instruction had a dependent relationship with the entry blocks DB2 and DB3. Furthermore, as the add-instruction is stored in the entry block IB2, the writing signal 32 acts to store the data dependency information in the subfield DEP2 that has a cooperative relationship with the entry block IB2. Namely, the subfield DEP2 of the entry block DB2 is set to 10 and, in the same manner the subfield DEP2 of the entry block DB3 is set 01. By the way, these 2-bit numbers 10 and 01 are used to indicate the dependency in a simplified way. In more detail, an upper digit of the 2-bit number indicates the dependency to the first source register and, to the contrary, a lower digit indicates the dependency to the second source register.

Figure 4:
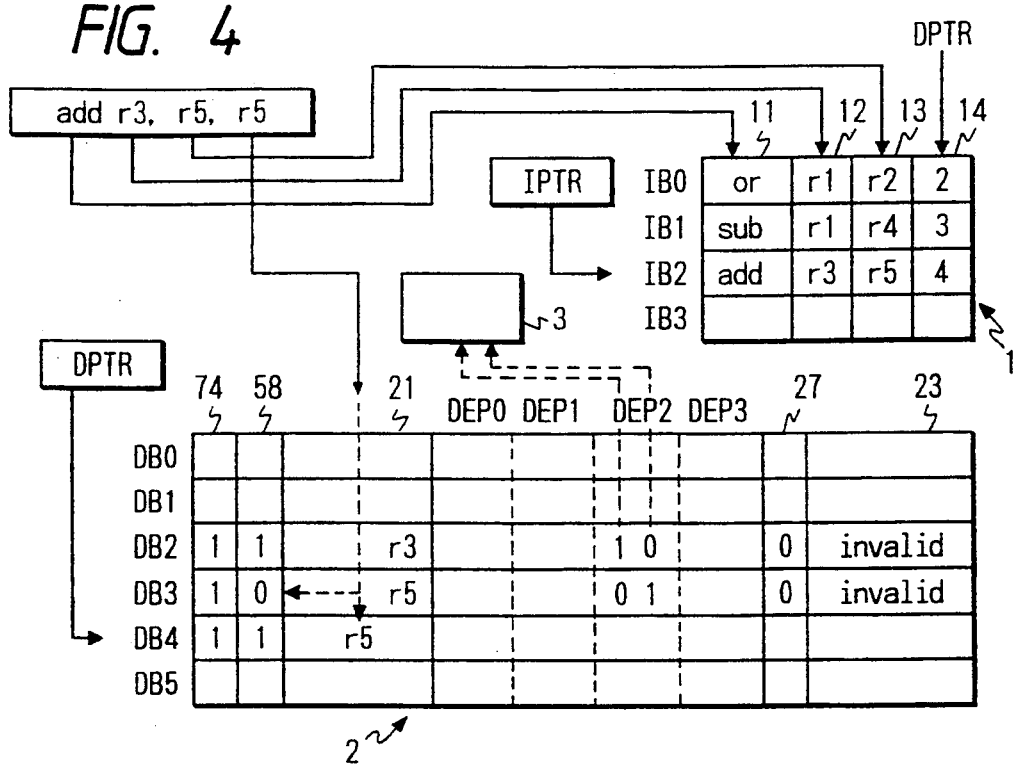
FIG. 4 is a simplified explanatory view partly illustrating an operation of the first embodiment, following the operation illustrated in FIG. 3.

Next, the destination register number r5 of the add-instruction is stored in the destination register field 21 of the entry block DB4. And also, the add-instruction is stored in the entry block IB2, as shown in FIG. 4. In this case, the data holding entry pointer field 14 of the entry block IB2 stores a value of the destination storing pointer DPTR; i.e. the numerical value 4 that shows the entry number of the data holding unit 2 storing the destination register number of this add-instruction. At the same time, the instruction selecting unit 3 is notified that the add-instruction cannot be executed due to the data dependency.

Figure 5:
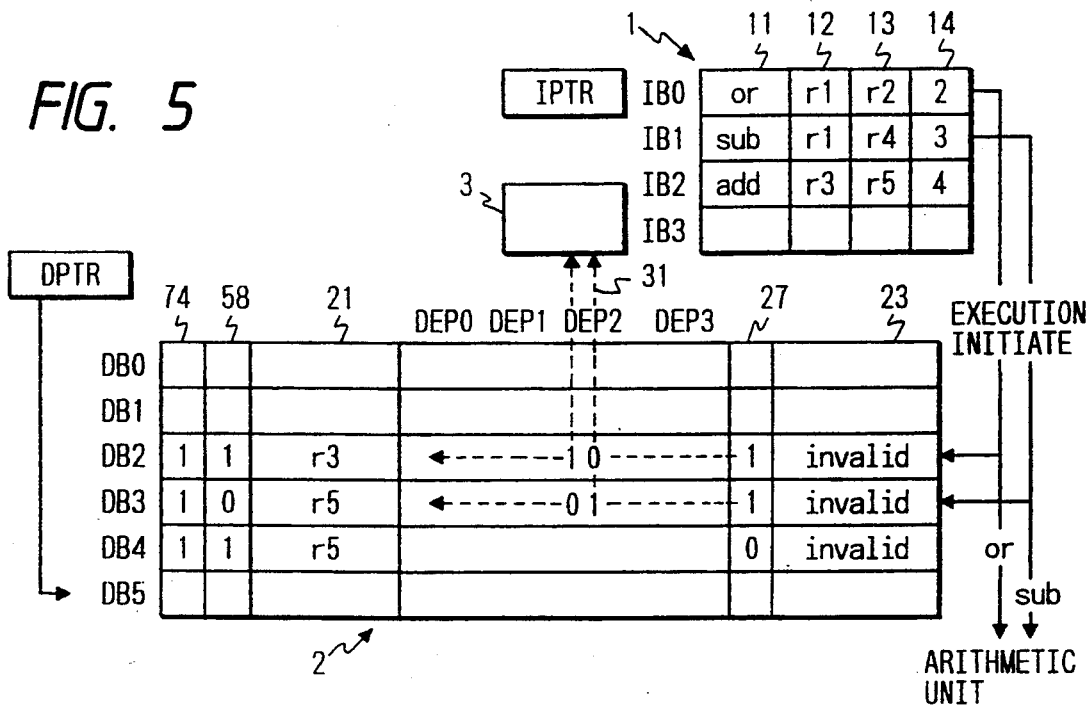
FIG. 5 is a simplified explanatory view partly illustrating an operation of the first embodiment, following the operation illustrated in FIG. 4.
Figure 6:
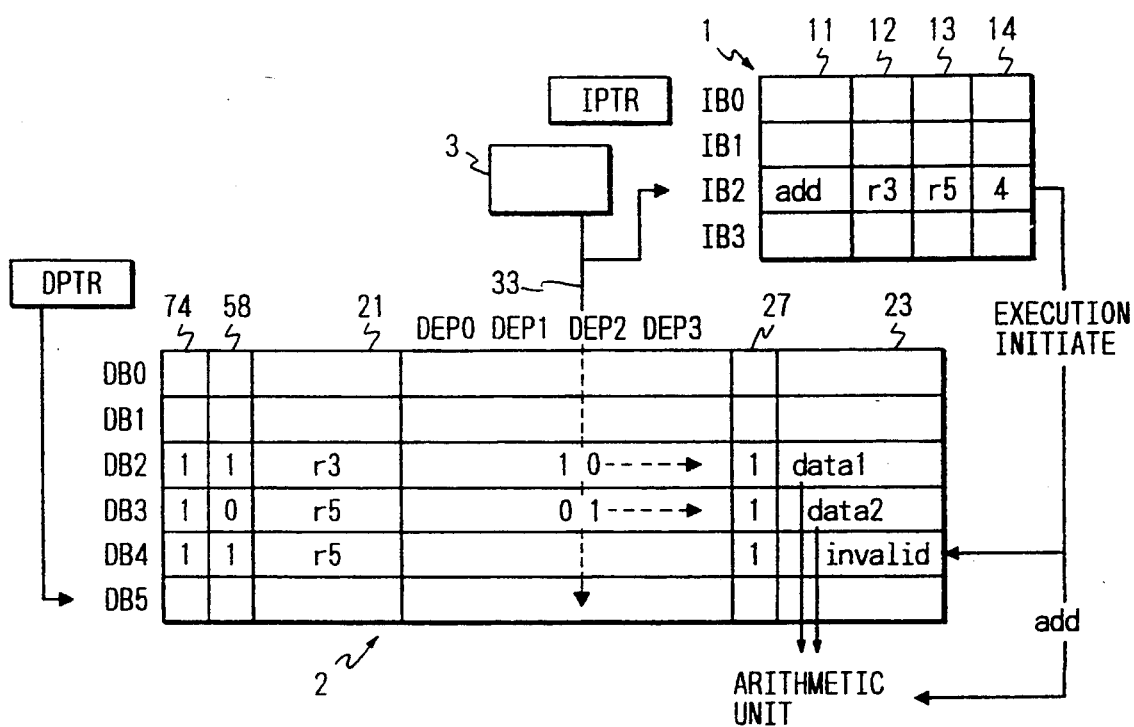
FIG. 6 is a simplified explanatory view partly illustrating an operation of the first embodiment, following the operation illustrated in FIG. 5.

FIG. 5 shows elimination of the data dependency. When the execution of the or-instruction and the sub-instruction stored in the instruction holding unit 1 is initiated, the data holding entry pointer field 14 selects the entry blocks DB2 and DB3. And, the data storing bit 27 is set to 1. Once the data storing bit 27 is set to 1, all data dependency subfield DEP0~DEP3 of that entry block are searched. As a result of this search, it is found that the subfield DEr2 is set 1. Then, the instruction executable signal 31 notifies the instruction selecting unit 3, functioning as an execution control unit of instructions, that the dependency to the entry block DEr2 has been eliminated. Thus, it is found that the instruction of the entry block IB2 corresponding to the subfield DEr2 is now executable. If any data dependency subfield other that DEP2 is set to 1, a plurality of instructions can be executed simultaneously.

In order to read out the data necessary for the execution of this add-instruction in the entry block IB2, the data reading-out signal 33 is given to the subfield DEP2 of the data holding unit 2. In response to this data reading-out signal 33, each subfield DEP2 of all the entry blocks of the data holding unit 2 are searched. As a result, the data of the data field 23 belonging to the entry block being set to 1 is outputted as an input data for the arithmetic unit. In more detail, "data 1" of the entry block DB2 is given to the arithmetic unit as its first input data and further "data 2" of the entry block DB3 is outputted as a second input data of the arithmetic unit. In this instance, output of data stored in the register file 5 is prohibited. However, it is also the fact that it may happen that either of two data is supplied from the data holding unit 2 and the other is supplied from the register file 5.

Though the number of entry blocks in the data holding unit is larger than that of the instruction holding unit in this embodiment, this is because the entry block in the data holding unit is long-term engaged with the result data until the result data is completely stored into the register file while the entry block in the instruction holding unit becomes available for the next instruction as soon as the execution of the instruction is initiated.

However, it is also possible to equalize the number of the entry blocks in the instruction holding unit with the number of the entry blocks in the data holding unit so that the instruction and its result data are intentionally stored in the entry blocks of the same number. In such a case, the data holding entry pointer field in the instruction holding unit can be omitted.

By the way, in FIGS. 2~6, a reference numeral 74 denotes an entry validity bit that shows whether or not the content in the data holding entry block is valid. And, a reference numeral 58 denotes a dependent object bit that is explained later in detail.

As is described in the foregoing description, in the case where the elimination of data dependency is checked in this embodiment, the pointer stored in the data holding entry pointer field 14 is utilized to designate an appropriate data holding entry block. Therefore, finding out the next executable instruction merely requires the searching of the dependency information subfield in the above designated entry block.

Thus, as it no longer requires the comparison of tags that was used in the conventional art, it becomes possible to reduce the scale of circuit and realize a speed-up of operation.

Moreover, in accordance with the present embodiment, all the instructions waiting for their executions are administrated in the lump. Therefore, if any one of the arithmetic units becomes available, this arithmetic unit can be immediately used for the execution of above waiting instruction no matter what kind of instruction it is. As a result, this results in that a plurality of arithmetic units are effectively run.

SECOND EMBODIMENT

Figure 7:
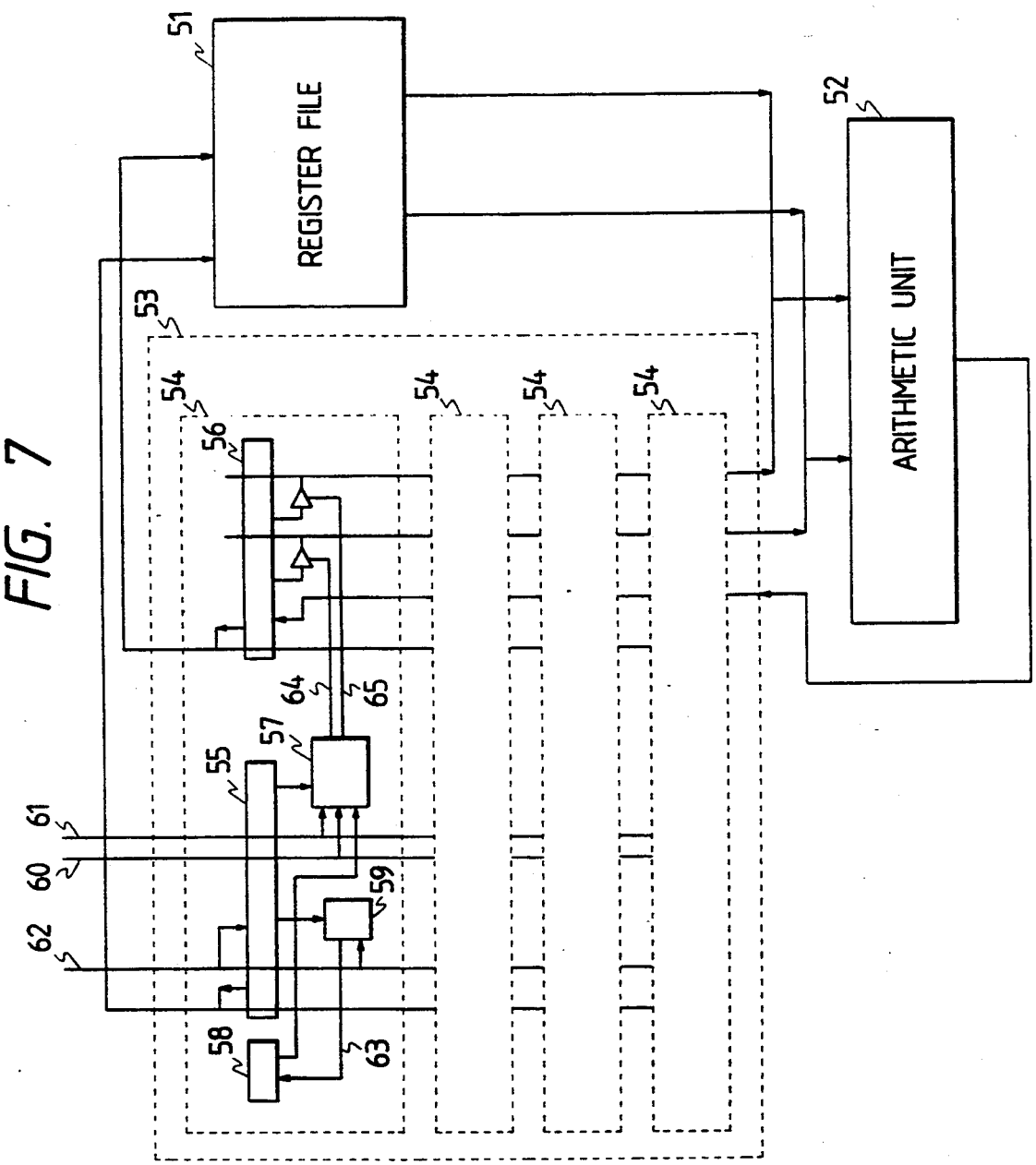
FIG. 7 is a schematic block diagram showing an information processing apparatus in accordance with a second embodiment of the present invention.

FIG. 7 shows a block diagram of an information processing apparatus in accordance with a second embodiment of the present invention. In FIG. 7, there are provided a register file 51, an arithmetic unit 52, and a data holding unit 53. The data holding unit 53 has a plurality of data holding entry blocks 54.

Each data holding entry block 54 contains a destination register field 55, a data field 56, a dependency detector 57, a dependent object bit 58, and a comparator 59. This embodiment is different from the conventional apparatus explained with reference to FIG. 11 chiefly in that the dependent object bit 58 and the comparator 59 are newly provided. Furthermore, the components suffixed by the same reference numeral in FIG. 7 and FIG. 11 function in the same way and, accordingly, are fundamentally the same component.

The dependent object bit 58 is provided for facilitating the detection of data dependency. That is, in the case where the same destination register number is simultaneously stored in a plurality of destination register fields 55 of the holding entry blocks 54, it is necessary to carry out the detection of data dependency exclusively with respect to the data holding entry block that registered the same destination register number last. The dependent object bit 58 is used to find out this latest registered data holding entry block.

In more detail, the dependent object bit 58 is set to 1 when the destination register number 62 is registered in the destination register field 55. Subsequently, when a new destination register number 62 is registered in another data holding entry block 54, the newly registered destination register number 62 is compared by the comparator 59 with the value already stored in the destination register field 55 to find out whether both values are coincident or not. If the newly registered destination register number 62 is equal with the value already stored in the destination register field 55, the comparator 59 outputs a coincidence signal 63 to the dependent object bit 58 so as to reset it to 0.

Namely, even if the same destination register number is stored simultaneously in a plurality of data holding entry blocks 54, only the dependent object bit 58 of the latest registered data holding entry block 54 is set to 1.

The value of this dependent object bit 58 is given to the dependency detector 57. In order to recognize the data dependency, the dependency detector 57 generates data dependency information 64, 65. But, the generation of data dependency information 64, 65 is carried out only when supplied source register numbers 60, 61 coincide with the destination register numbers stored in the destination register field 55 and further the dependent object bit 58 is set to 1.

An operation of this embodiment is explained in more detail with reference to FIG. 4. The newly given add-instruction has a destination register r5 that is equal to the destination register number already stored in the data holding entry block DB3.

At the timing that the destination register number r5 of the add-instruction is stored in the data holding unit 2, destination register fields 21 of all the entry blocks of data holding unit 2 are searched. Then, as the entry block DB3 has the same destination register number r5, the dependent object bit 58 of the entry block DB3 is reset to 0. In other words, among a plurality of entry blocks that hold the same destination register number r5, only the dependent object bit of the latest entry block DB4 is set to 1.

As is described in the foregoing description, even if the same destination register number is stored simultaneously in a plurality of data holding entry blocks, the dependency detector carries out the detection of data dependency with respect to only the latest registered destination register number. Thus, it is no longer necessary to prioritize a plurality of data dependency information to select a correct one, thereby resulting in a high-speed detection of data dependency.

THIRD EMBODIMENT

Figure 8:
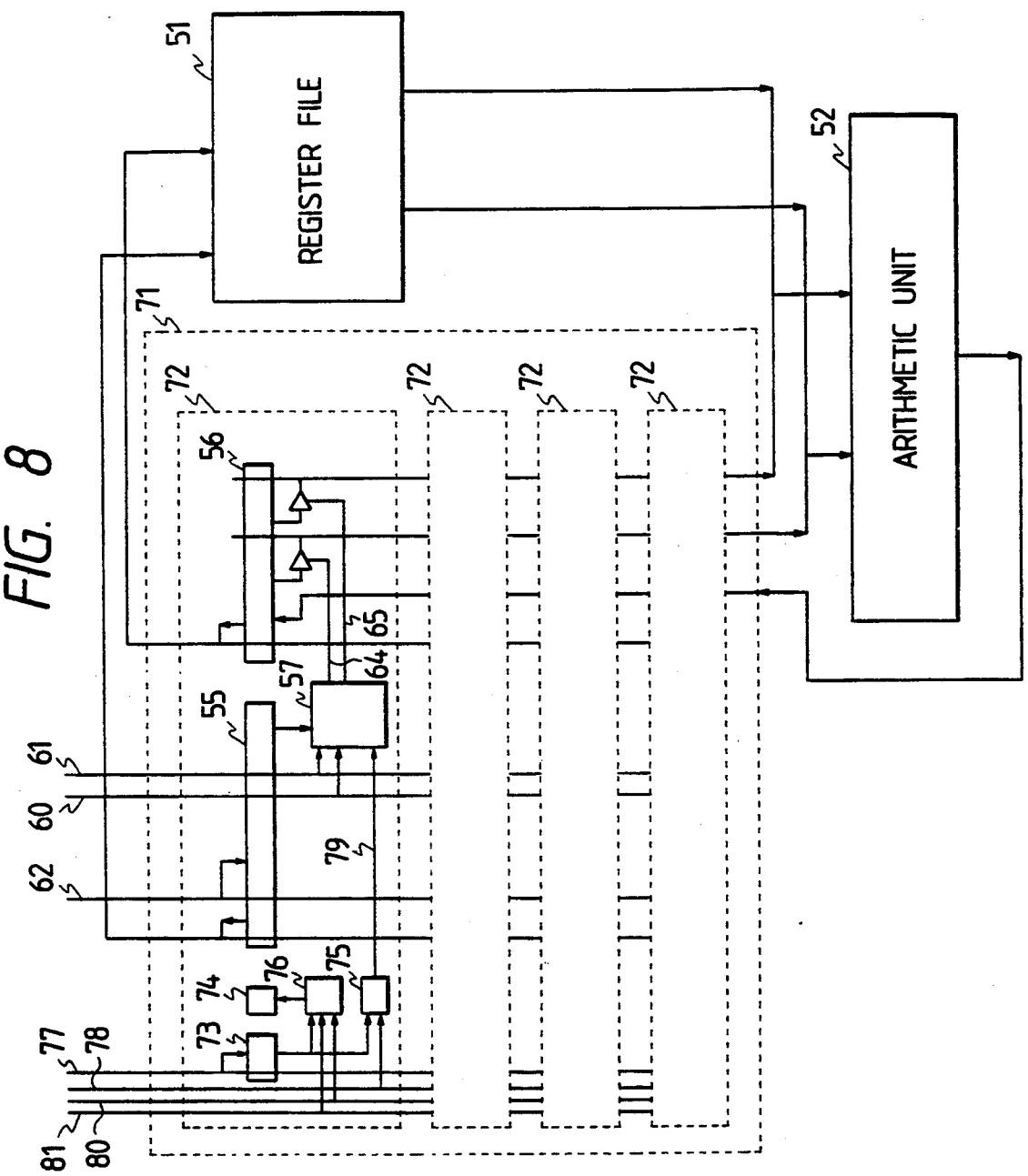
FIG. 8 is a schematic block diagram showing an information processing apparatus in accordance with a third embodiment of the present invention.
Figure 10:
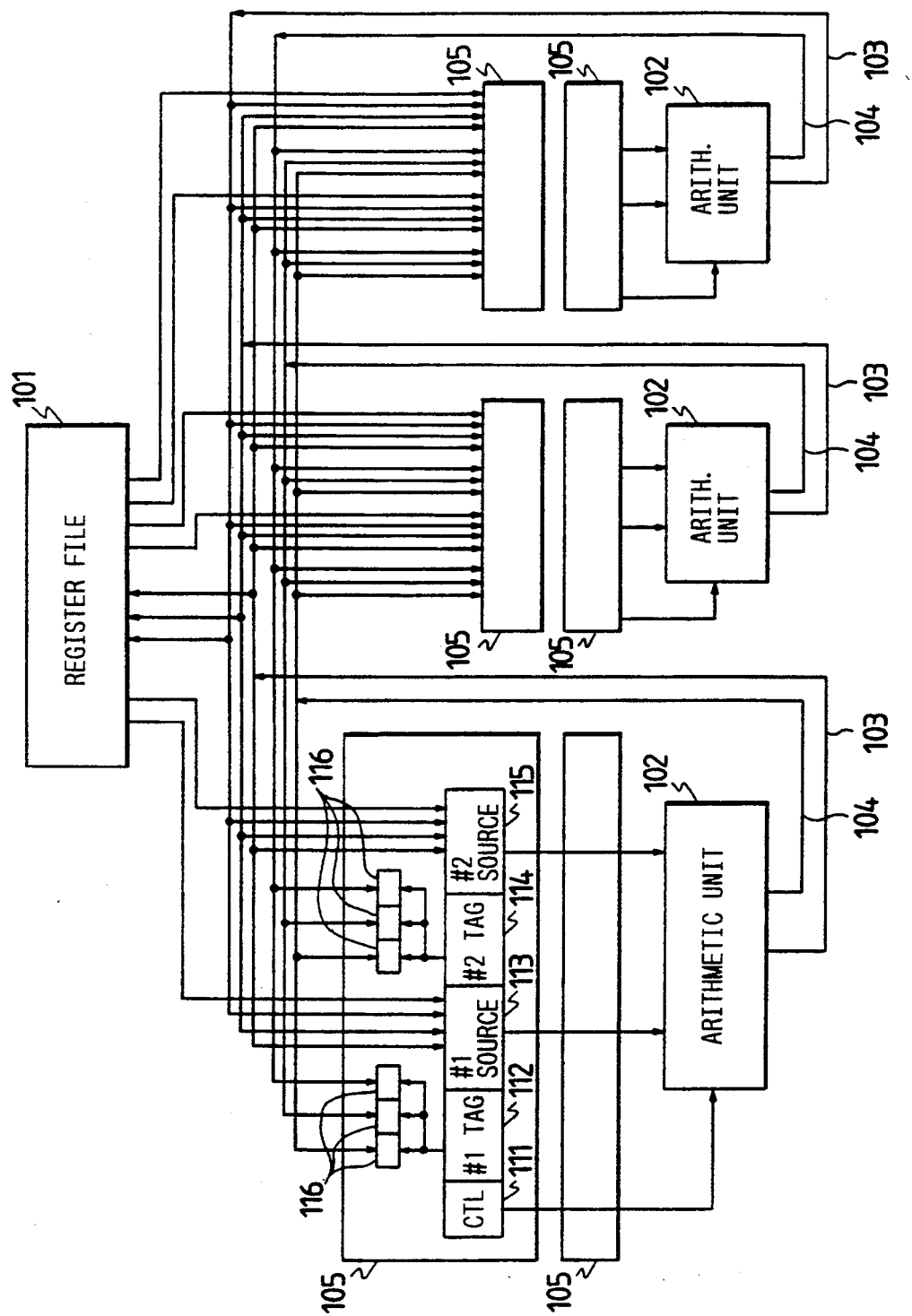
FIG. 10 is a schematic block diagram showing a conventional information processing apparatus utilizing reservation stations.

FIG. 8 is a block diagram showing an information processing apparatus in accordance with a third embodiment of the present invention. In FIG. 8, a reference numeral 71 denotes a data holding unit that contains a plurality of data holding entry blocks 72.

Figure 11:
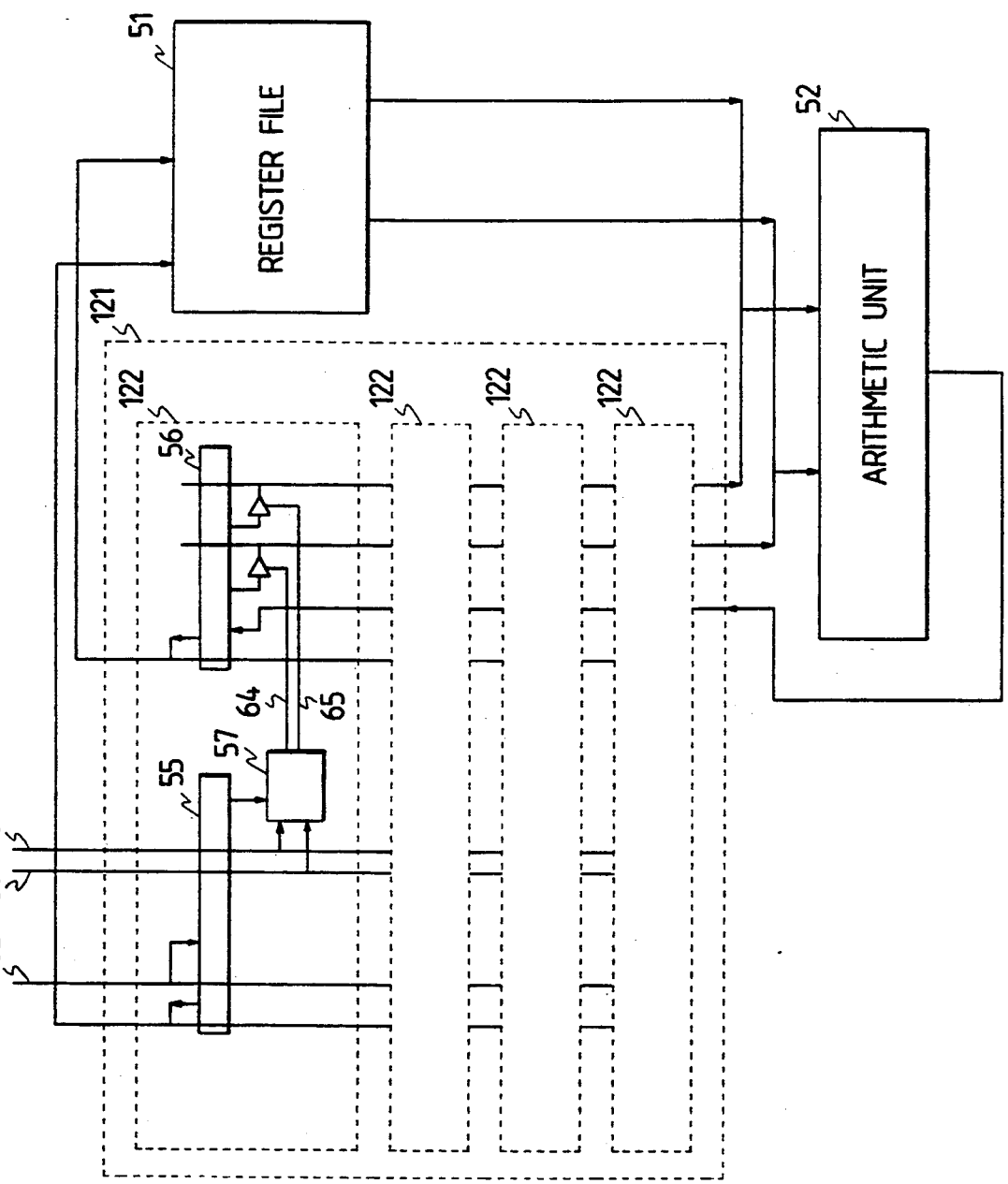
FIG. 11 is a block diagram showing a conventional information processing apparatus accommodating a reorder buffer; and, FIG. 12 is a view showing a constitution of a conventional selecting circuit having prioritization function.
Figure 12:
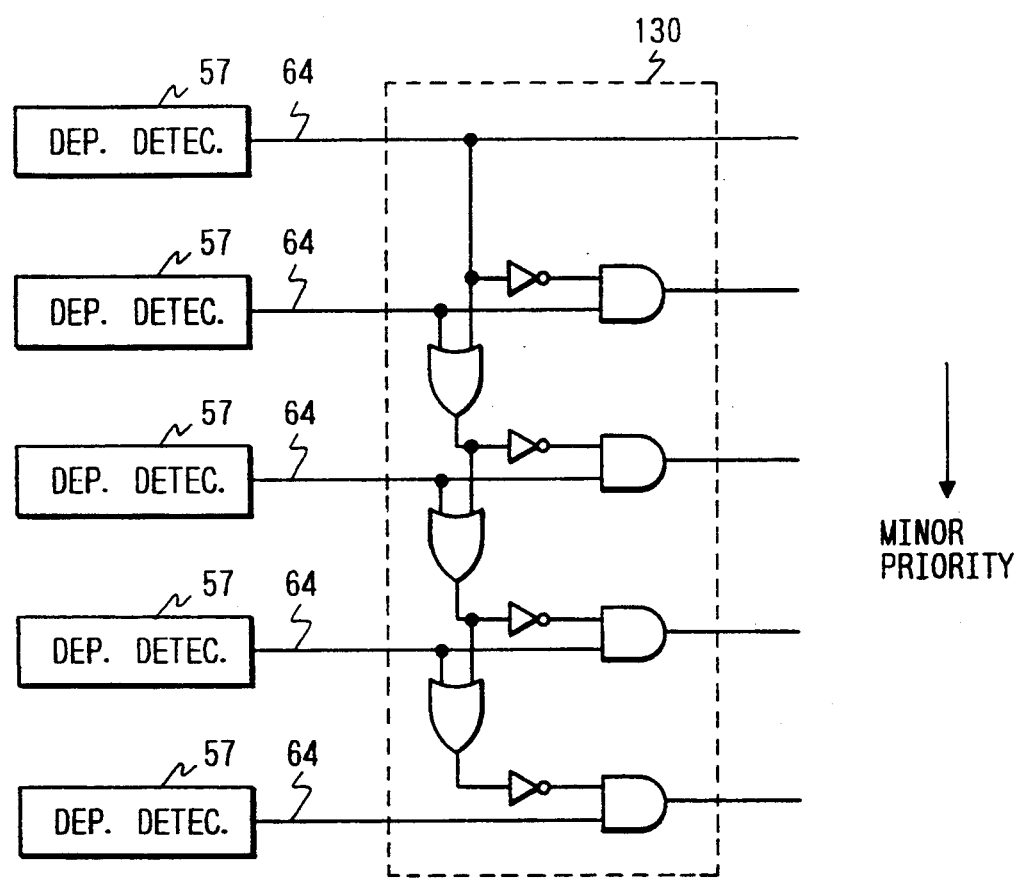

The data holding entry block 72 includes a flow field 73, a validity bit 74, a flow discriminating circuit 75, and a flow invalidating circuit 76 in addition to previously explained components involved in the reorder buffer of FIG. 11; i.e. the destination register field 55, the data field 56, and the dependency detector 57.

The flow field 73 stores a flow bit of 3-bit type. By the way, the flow bit functions to simply indicate which flow the subject instruction belongs to. Namely, several flows such as a before-taken flow, a taken flow, and a not-taken flow are discriminated. In this case, the before-taken flow is a flow that is executed before a branch instruction. The taken flow is a flow that is executed after the branching-off condition is satisfied. And, the not-taken flow is a flow that is executed when the branching-off condition is not satisfied.

FIG. 9 shows an example of several flow bits. A flow of the add-instruction in the address 100 is now referred to as the before-taken flow and its flow bit is determined as 001. The same flow continues until it reaches a branch instruction "be", registered in the address 108. Furthermore, it is now supposed that the execution of the branching-off operation is delayed. That is, before the instruction belonging to the taken flow is executed, the next instruction following this branch instruction "be" is executed.

Accordingly, an or-instruction registered in address 10c is surely executed irrespective of whether or not the branching-off condition is satisfied and is, thus, regarded as the before-taken flow. As a result, flows continuing from the address 100 to the address 10c are indicated by the same flow bit 001.

Once the branching-off condition is fulfilled, the sub- instruction registered in the address 200 is executed. The instructions registered in the address 200 and its following addresses are regarded as the taken flow and indicated by the same flow bit 100. If the branching-off condition is not fulfilled, the instructions registered in the address 110 and its following addresses are executed. Thus, these instructions are regarded as the not-taken flow and indicated by the same flow bit 010.

When the branching-off condition is once fulfilled, the taken flow or the not-taken flow comes to be regarded as the before-taken flow and therefore the instructions involved in this taken or not-taken flow are given the same flow bit number until the next branch instruction appears.

For example, in the case where the branch instruction appears, a flow bit 100 is used to indicate the before-taken flow and a flow bit 001 is used to indicate the not-taken flow and a flow bit 010 is used to indicate the taken flow. In this manner, it becomes possible to classify the flows registered before and after the branch instruction into several groups by use of flow bits of 3-bit type.

By using these flow bits, the instructions involved in the taken or not-taken flows can be executed without waiting for the fulfillment of the branching-off condition.

The data obtained as a result of execution is stored in the data field 56 in the data holding unit 71 and held until the branching-off condition is fulfilled. Once the branching-off condition is fulfilled, instructions becoming unnecessary in the holding unit are invalidated. That is, the instructions involved in the not-taken flow are invalidated in the case where the branching-off condition is fulfilled or, on the contrary, the instructions involved in the taken flow are invalidated in the case where the branching-off condition is not fulfilled.

Next, if instructions of a plurality of flows are registered in the data holding unit, discrimination of these flows becomes necessary to check the data dependency relationship with a source register number of a newly given instruction.

This operation is explained hereinafter with reference to FIG. 8. When the destination register number 62 is stored in the destination register field 55 of the data holding entry block 72, a flow bit 77 accompanying the flow of this instruction is stored in the flow field 73. In this instance, the entry validity bit 74 is set to 1.

Next, when the source register numbers 60, 61 are given for the detection of data dependency, a flow bit 78 indicating the flow of the object of data dependency is given together with these source register numbers 60, 61. For example, in the case where the given source register belongs to the instruction of the taken flow, the flows becoming the object of data dependency are the before-taken flow and the taken flow.

In this case, since a logical sum of flow bits of two flows are 101, a flow bit of 101 is given for data dependency check.

Each flow discriminating circuit 75 in respective data holding entry blocks 72 compares the given flow bit 78 with the flow bit 77 stored in the flow field 73 to output the dependency object signal 79. In this case, every bit obtains a logical multiply. And, if any one bit becomes 1, this shows that the corresponding data holding entry block 72 is an object of data dependency. Then, the dependency object signal 79 is supplied to the dependency detector 57. The dependency detector 57 generates data dependency information 64, 65 only when the data dependency relationship is recognized.

Still further, in the case where instructions are executed before the branching-off condition is fulfilled and their result data are held in the data holding unit 71, these instructions may become unnecessary due to the fulfillment of the branching-off condition. In such a case, a flow bit 80 indicating the unnecessary flow and the invalidation request signal 81 are given.

For instance, if it is found that no branching-off operation happens as a result of the judgement of branching-off condition, a flow bit of 100 is given since the instructions of the taken flow become unnecessary.

The flow bit 80 for the invalidation and the invalidation request signal 81 are given to the flow invalidating circuits 76 in respective data holding entry blocks 72. The flow invalidating circuit 76 compares the given flow bit 80 with the flow bit stored in the flow field 73. If the given flow bit 80 coincides with the flow bit stored in the flow field 73, the entry validity bit 74 in the corresponding data holding entry block 72 is reset to 0 so as to accomplish the invalidation. The data stored in the data field 56 of the data holding entry block 72, whose entry validity bit is reset, is not stored in the register file 51.

In this embodiment, though the flow bit is defined as 3 bit type, it is also possible to use a larger number of bits to discriminate flows exceeding a plurality of branching-off instructions and carry out the out-of-order execution exceeding these plurality of branch instructions without waiting the fulfillment of their branching-off conditions.

In this manner, instructions registered in a plurality of flows succeeding the branch instruction can be executed before the branching-off condition is fulfilled. Therefore, it becomes possible to avoid deterioration of performance such that transaction of instructions is halted since the branching-off condition is not fulfilled.

Furthermore, it is possible to anticipate whether or not the branching-off operation is carried out with respect to the conditioned branch instruction and execute instructions of the anticipated flow, and to invalidate the instructions of the anticipated flow only when the anticipation did not come true. Such an operation can be realized by the constitution having removed the flow discriminating circuit from the above-described circuit.

Moreover, by providing the dependent object bit in each data holding entry block so as to correspond to every instruction flow, it becomes possible to detect data dependency of latest destination register number in each instruction flow.

Though the embodiments shown in FIGS. 1, 7, and 8 adopt arithmetic units as execution units, it is needless to say that load/store processing apparatuses and branch processing apparatuses are also applicable for the execution units.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An information processing apparatus comprising:
   register file means for containing a plurality of data storing registers;
   data holding means for including a plurality of data holding entry blocks;
   temporary instruction holding means having a plurality of instruction holding entry blocks for temporarily holding instructions;
   execution means for executing transaction designated by instructions and outputting resultant data in response to data read out from said register file means or said data holding means;
   said data holding means further operating for temporarily storing the resultant data and renewing said register file means;
   instruction selecting means for selecting an instruction executable among instructions held in said temporary instruction holding means;
   said data holding entry blocks including a data field storing said resultant data outputted from the execution means, a destination register field storing a destination register number, a dependency detector, a dependency information field, and a data storing bit that shows a storing state of data in said data field;
   said dependency detector being connected to said destination register field so as to compare a source register number of any succeeding instruction with a destination register number stored in the destination register field to detect data dependency relationship and output data dependency information;
   said dependency information field holding said data dependency information and outputting an instruction executable signal based on said data dependency information and said data storing bit; and
   said instruction selecting means responding to said instruction executable signal to select the executable instruction among instructions stored in said temporary instruction holding means.

2. An information processing apparatus in accordance with claim 1 in which said dependency information field includes a plurality of dependency information subfields corresponding to said plurality of instruction holding entry blocks, respectively, and said data dependency information is stored in a dependency information subfield corresponding to the instruction holding entry block that holds a related instruction, and further said dependency information subfield outputs the instruction executable signal based on said data dependency information and said data storing bit.

3. An information processing apparatus in accordance with claim 1 in which said instruction holding entry block of the temporary instruction holding means involves a control field storing a control information obtained by decoding an instruction by means of an instruction decoder, a source register field, and a data holding entry pointer field for storing a pointer for designating the entry block in the data holding means.

4. An information processing apparatus in accordance with claim 1 in which an instruction being decoded by an instruction decoder is stored together with its source register number in one of temporary instruction holding entry blocks and, at the same time, the data dependency information outputted from the dependency detector is stored in one of dependency information subfields of said dependency information field, and a destination register number is stored in a destination register field of one of data holding entry blocks.

5. An information processing apparatus in accordance with claim 4 in which said one of said dependency information subfields into which the data dependency information is stored is designated by a writing signal so as to correspond to the instruction holding entry block into which the decoded instruction is stored.

6. An information processing apparatus in accordance with claim 4 in which an entry number of said one of data holding entry blocks is stored in a data holding entry pointer field of the instruction holding entry block that stores the decoded instruction.

7. An information processing apparatus in accordance with claim 4 in which, when the data dependency information shows no existence of data dependency or when the data field already stores a resultant data irrespective of data dependency, the instruction executable signal is outputted to notify that the instruction stored in the corresponding one of instruction holding entry blocks is in an executable condition.

8. An information processing apparatus in accordance with claim 7 in which the instruction selecting means responds to said instruction executable signal to select an instruction to be initiated its execution.

9. An information processing apparatus in accordance with claim 8 in which said instruction selecting means selects instructions simultaneously up to as many as the number of execution means.

10. An information processing apparatus in accordance with claim 8 in which said instruction selecting means gives a data reading-out signal to one of dependency information subfields that corresponds to said selected instruction.

11. An information processing apparatus in accordance with claim 10 in which, in response to said data reading-out signal, the data holding means searches the dependency information subfield which is given the data reading-out signal so that the data holding entry block having data dependency is picked up and, in turn, the data in its data field is read out.

12. An information processing apparatus in accordance with claim 11 in which a data validity signal showing validity of the data is also outputted together with said data, and either the data of the data holding means or the data of the register file is selected based on the data validity signal and, then, supplied to said execution means so that an arithmetic operation designated by the control information read out from a control field of the corresponding instruction holding entry block can be executed.

13. An information processing apparatus in accordance with claim 1 in which said data storing bit is set when resultant data is stored in a corresponding one of the data holding entry blocks.

14. An information processing apparatus in accordance with claim 13 in which the dependency information field in said one of data holding entry block is searched to find out any dependency information subfield having data dependency.

15. An information processing apparatus in accordance with claim 14 in which, if data dependency is recognized, the instruction executable signal is generated in order to indicate that data dependency relationship is resolved.

16. An information processing apparatus in accordance with claim 1 in which said execution means consists of a plurality of arithmetic units each carrying out a predetermined arithmetic operation independently with each other.

17. An information processing apparatus in accordance with claim 1 in which two instructions are supplied per cycle and these instructions are executed by out-of-order execution in said execution means.

18. An information processing apparatus comprising:
register file means for containing a plurality of data storing registers;
data holding means for including a plurality of data holding entry blocks;
execution means for executing transaction designated by instructions and outputting resultant data in response to data read out from said register file means or said data holding means;
said data holding entry blocks including a data field storing said resultant data outputted from the execution means, a destination register field storing destination register numbers, a dependency detector, a dependent object bit, and a comparator;
said dependent object bit being set, when a same destination register number is stored simultaneously in a plurality of data holding entry blocks, to identify a data holding entry block that registered said same destination register number lastly; and
said dependency detector carrying out detection of data dependency with respect to only the destination register number in the data holding entry block whose dependent object bit is set.

19. An information processing apparatus comprising:
register file means for containing a plurality of data storing registers;
data holding means for including a plurality of data holding entry blocks;
execution means for executing transaction designated by instructions and outputting resultant data in response to data read out from said register file means or said data holding means;
said data holding entry blocks including a data field storing said resultant data outputted from the execution means, a destination register field storing destination register numbers, a dependent detector, a dependent object bit, and a comparator;
said dependent object bit being set when the destination register number is stored in the destination register field of its corresponding data holding entry block;
said dependency detector comparing the destination register number stored in the destination register field with destination register number of any succeeding instruction to output a coincident signal when these destination register numbers coincide with each other;
said dependent object bit being reset in response to said coincident signal; and
said dependency detector being connected to said destination register field so as to compare a source register number of the succeeding instruction with the destination register number stored in the destination register field to detect data dependency and output a data dependency information under the condition that said dependent object bit is set.

20. An information processing apparatus comprising:
register file means for containing a plurality of data storing registers;
data holding means for including a plurality of data holding entry blocks;
execution means for executing transaction designated by instructions and outputting resultant data in response to data read out from said register file means or said data holding means;
said data holding entry blocks including a data field storing said resultant data outputted from the execution means, a destination register field storing destination register numbers, a dependency detector, an entry validity bit, a flow field, a flow discriminating circuit, and a flow invalidating circuit;

said entry validity bit being set when the destination register number is stored in the destination register field;

said flow field storing a flow bit discriminating flow of instruction;

said flow discriminating circuit comparing a flow bit indicating the flow that becomes an object of data dependency with said flow bit stored in said flow field to output a dependent object signal;

said dependency detector being connected to said destination register field so as to compare a source register number of any succeeding instruction with the destination register number stored in said destination register field to detect the data dependency and output a data dependency information in the case where said dependent object signal is outputted;

said flow invalidating circuit inputting an invalidating flow bit and an invalidating request signal and comparing said invalidating flow bit with said flow bit stored in said flow field when the invalidation is requested by the invalidating request signal; and said entry validity bit being reset in response to the comparison result of said flow invalidating circuit.

21. An information processing apparatus in accordance with claim 20 in which said flow field stores a flow bit of several-bit type.

22. An information processing apparatus in accordance with claim 20 in which said flow bit functions to simply indicate which flow a subject instruction belongs to.

23. An information processing apparatus in accordance with claim 20 in which said flow bit discriminates several flows such as a before-taken flow, a taken flow, and a not-taken flow, wherein the before-taken flow is a flow that is executed before a branch instruction, and the taken flow is a flow that is executed after a branching-off condition is satisfied, and further, the not-taken flow is a flow that is executed when the branching-off condition is not satisfied.

24. An information processing apparatus in accordance with claim 23 in which said flow bit allows either an instruction involved in the taken flow or an instruction involved in the not-taken flow to be executed without waiting for the fulfillment of the branching-off condition.

25. An information processing apparatus in accordance with claim 24 in which instructions involved in the not-taken flow are invalidated in the case where the branching-off condition is fulfilled or, on the contrary, instructions involved in the taken flow are invalidated in the case where the branching-off condition is not fulfilled.

* * * * *